United States Patent [19]

Yanagi et al.

[11] Patent Number: 5,596,028
[45] Date of Patent: Jan. 21, 1997

[54] ANAEROBIC ADHESIVE AND SHEET

[75] Inventors: Masato Yanagi; Satoru Kagao; Makoto Dohi; Sanae Nakaizumi, all of Tokyo, Japan

[73] Assignee: Toyo Ink Manufacturing Co., Ltd., Tokyo, Japan

[21] Appl. No.: 418,874

[22] Filed: Apr. 7, 1995

Related U.S. Application Data

[63] Continuation of Ser. No. 194,156, Feb. 9, 1994, abandoned.

[30] Foreign Application Priority Data

Feb. 10, 1993 [JP] Japan .................... 5-023061

[51] Int. Cl.$^6$ .................... C09J 4/06; C09J 163/00; C08C 19/04
[52] U.S. Cl. .................... 523/176; 524/270; 524/271; 524/272; 524/274; 525/108; 525/332.5; 525/387; 526/227; 526/273
[58] Field of Search .................... 523/176; 524/270–272; 525/108, 332.5, 387; 526/227, 273

[56] References Cited

U.S. PATENT DOCUMENTS

| | | | |
|---|---|---|---|
| 4,057,527 | 11/1977 | Columbus | 524/272 |
| 4,092,376 | 5/1978 | Douek et al. | 523/176 |
| 4,107,142 | 8/1978 | Cunliffe et al. | 526/273 |
| 4,431,787 | 2/1984 | Werber | 526/273 |
| 5,409,764 | 4/1995 | Otsuki et al. | 528/272 |

FOREIGN PATENT DOCUMENTS

| | | |
|---|---|---|
| 0316873A2 | 5/1989 | European Pat. Off. . |
| 0467641A1 | 1/1992 | European Pat. Off. . |

OTHER PUBLICATIONS

Database WPI, Section Ch, Week 9050, Derwent Publications, Ltd., London, GB, Class A81 AN 90–373615 and JP-A-02 272 075 (Yokohama Rubber KK) 6 Nov. 1990.

Database WPI, Section Ch, Week 8710, Derwent Publications, Ltd., London, GB, Class A94 AN 87–067582 and JP-A-62 019 445 (Toyoda Goseki KK) 28 Jan. 1987.

Database WPI, Section Ch, Week 8209, Derwent Publications, Ltd., London, GB, Class A81 AN 82–16802E and JP-A-57 014 034 (Idemitsu Kosan KK) 25 Jan. 1982.

Database WPI, Section Ch, Week 7651 Derwent Publications, Ltd., London, GB, Class A81 AN 76–94875E and JP-A-51 125 138 (Showa Tape KK) 2 Nov. 1976.

*Primary Examiner*—Tae Yoon
*Attorney, Agent, or Firm*—Wenderoth, Lind & Ponack

[57] ABSTRACT

An anaerobic adhesive which undergoes setting only by attaching it to an article without applying any special energy, and an anaerobically setting adhesive sheet prepared by coating or impregnating a sheet with the above anaerobic adhesive and well-balanced between storage stability and setting properties, the anaerobic adhesive comprising;

(A) a rubber-based resin having adhesion properties, (B) a compound which has both the capability of absorbing oxygen and the capability of forming peroxide, and which shows an oxygen absorption amount of 0.1 to 3.0% (weight of absorbed oxygen/weight) and an active oxygen amount of 0.01 to 1.0% (weight of active oxygen/weight), (C) an ethylenically unsaturated monomer or oligomer, and (D) an organic peroxide.

3 Claims, No Drawings

ANAEROBIC ADHESIVE AND SHEET

This application is a continuation of now abandoned application Ser. No. 08/194,156, filed Feb. 9, 1994.

FIELD OF THE INVENTION

The present invention relates to an anaerobic adhesive which shows adhering properties when attached to an adherend or article (which is to be bonded to another), adheres to the article temporarily and undergoes setting to show high adhesion strength. It also relates to a sheet or tape (to be simply referred to as "sheet" hereinafter) coated with the above anaerobic adhesive. In the field where a pressure-sensitive tape is used, this anaerobic adhesive sheet is suitably used when high reliability for adhesion is required but conventional pressure-sensitive sheets are not so satisfactory as expected. Further, in the field where an adhesive is used, this anaerobic adhesive sheet is suitably used as a substitute for an adhesive where the advantage of an adhesive in the form of a sheet works or the use of an adhesive may contaminate a working environment.

PRIOR ART OF THE INVENTION

A setting type adhesive sheet which shows adhering properties when attached to an article, easily adheres to the article temporarily and the undergoes setting to show high bond strength is typically classified into a humidity-setting adhesive sheet which undergoes setting in the presence of moisture in air or water in an article (JP-B-47-44017, JP-B-49-5895, JP-A-54-64536, JP-A-58-171460, JP-A-59-58071, JP-A-61-145268 and JP-A-61-148281) and an anaerobically setting adhesive sheet which undergoes setting by shielding it from air (JP-B-58-12918, JP-A-59-199784, JP-A-59-199785, JP-A-60-6773, JP-A-60-11568 and JP-A-60-13868).

However, both the adhesive sheets of the above types have vital problems. That is, the humidity-setting adhesive sheet is required to be stored in a dry state before use, and its production requires special facilities. The anaerobically setting adhesive sheet is required to be stored in such a state that it is always in contact with air, and it has a difficulty in that an attempt to improve the setting properties so that the adhesive undergoes in the presence of a small oxygen amount and an attempt to improve the storage stability are contradicting each other. It is hence very difficult to allow general pressure-sensitive setting adhesive sheets to exhibit balanced functions, and there can be obtained only setting-type adhesive sheets which are unsatisfactory in a balance between storage stability and setting properties or between adhering properties and adhesion properties.

In an adhesion method in which a setting-type adhesive sheet is attached to the surface of one article, the article is processed (punched) with a peel liner on the adhesive sheet, the peel liner is peeled off and the article is attached to other article, the adhesive sheet is required to exhibit the following performance; The adhesive of the adhesive sheet does not undergo setting when allowed to stand in air at room temperature before the two articles are attached to each other, and only when the article are attached, the setting proceeds and the adhesive adheres to the other article. The humidity-setting adhesive sheet is required not only to be produced while it is shielded from moisture, and but also to be stored in a sealed state. As soon as it is opened for use, the settings starts. It is hence difficult to use it for the processing after the opening of the adhesive sheet but with a peel line on the adhesive. Therefore, the humidity-setting adhesive is not suitable for use in the above adhesion method. It is widely known that an anaerobic adhesive sheet is free of such a fatal problem, and that it is only an anaerobic adhesive sheet that can be suitably used in the above method. However, a number of problems are remaining to solve for compatibilizing the storage stability before use and the setting properties after articles are attached through it. The storage stability and the setting properties are contradicting in this anaerobic adhesive sheet as already described, and it has been very difficult to produce an anaerobic adhesive sheet having adequate performance for practical use.

SUMMARY OF THE INVENTION

It is an object of the present invention to provide an anaerobic adhesive which undergoes setting only by attaching it to an article without applying any special energy, and an anaerobically setting adhesive sheet prepared by coating or impregnating a sheet with the above anaerobic adhesive (to be referred to as an "anaerobic adhesive sheet" hereinafter).

It is another object of the present invention to provide an anaerobic adhesive sheet which is well-balanced between storage stability and setting properties.

According to the present invention, there is provided an anaerobic adhesive comprising;

(A) a rubber-based resin having adhesion properties, (B) a compound which has both the capability of absorbing oxygen and the capability of forming peroxide, and which shows an oxygen absorption amount of 0.1 to 3.0% (weight of absorbed oxygen/weight) and an active oxygen amount of 0.01 to 1.0% (weight of active oxygen/weight), (C) an ethylenically unsaturated monomer or oligomer, and (D) an organic peroxide, wherein:

the amount of the compound (B) is 30 to 150 parts by weight per 100 parts by weight of the adhesive rubber-based resin (A), the amount of the organic peroxide (D) is 0.1 to 15 parts by weight per 100 parts by weight of the adhesive rubber-based resin (A), and the ethylenically unsaturated monomer or oligomer (C) is contained in such an amount that the amount of ethylenically unsaturated groups of the ethylenically unsaturated monomer or oligomer (C) per mole of the active oxygen contained in the compound (B) is 2 to 140 mol.

According to the present invention, further, there is provided an anaerobic adhesive sheet comprising the above anaerobic adhesive and a substrate, the substrate being chafed with the anaerobic adhesive or impregnated with the anaerobic adhesive.

DETAILED DESCRIPTION OF THE INVENTION

In the anaerobic adhesive sheet (anaerobically setting adhesive sheet) of the present invention, a resin (adhesive) undergoes setting to exhibit adhesion after articles are attached to each other through the anaerobic adhesive sheet. In the adhesion based on the setting of the resin, the anaerobic adhesive sheet of the present invention does not differ much from conventional setting-type adhesive sheets.

However, the setting method employed in the present invention is constituted of a conventional setting mechanism and a novel setting mechanism. The present invention has been completed on the basis of extensive studies of these setting mechanisms.

An anaerobically setting composition contains a polymerizable monomer (or oligomer) and a polymerization initiator such as an organic peroxide as is already known, and it undergoes setting by cutting oxygen off. On the other hand, the novel setting mechanism used in the present invention is characteristically inherent to a composition containing a compound having a conjugated double bond, and it uses the vigorous reactivity of the conjugated double bond portion.

There are a number of reactions relating to a conjugated double bond, while an oxidation reaction which proceeds to absorb oxygen in air and the Diels-Alder reaction have important relations to the novel setting mechanism in the present invention. In particular, the autoxidation of conjugated double bond portion gradually generates organic peroxide to store active oxygen in the system. The decomposition of the organic peroxide generates radical, and the radical initiates the crosslinking reaction of the resin and the reaction of unsaturated bond to cause the setting of the resin. However, the autoxidation of conjugated double bond proceeds very slowly since it is a solid phase reaction within the adhesive sheet produced at room temperature. The oxidation to absorb oxygen, the formation and decomposition of organic peroxide and the radical-based setting of the resin can be all said to be mild reactions. On the other hand, the radical generated by the decomposition of the organic peroxide, which is formed in the process of the autoxidation to absorb ambient oxygen, is not completely consumed by ambient oxygen, but effectively serves to cause the resin-setting reaction. However, while the anaerobic adhesive sheet is stored, the formed organic peroxide does not generate radical in such an amount that the setting of the resin is caused, and the radical is consumed by a trace amount of air contained in an adhesive layer and a peel liner. As a result, the setting reaction does not take place. Only when an article is attached to other article, the oxygen supply is cut off, ambient oxygen is completely consumed by the oxidation, and the radical contributes vigorously to the unsaturated resin and serves to cause the setting reaction. Therefore, the formation and decomposition of the organic peroxide repeatedly proceed at a very low rate before articles are attached to each other through the anaerobic adhesive sheet. While the anaerobic adhesive sheet is stored, the compound (B) is not completely oxidized since it is present in a large amount, and the anaerobic adhesive sheet retains the setting properties.

The organic peroxide (D) decomposes only at a very low rate at room temperature, and does not cause the setting when ambient oxygen is present adequately. In the present invention, however, ambient oxygen is absorbed by the compound (B), and the organic peroxide (D) causes the setting. In the present invention, therefore, the setting takes place on the basis of both the activity of the organic peroxide generated by the oxygen absorption by the compound (B) and the activity of the organic peroxide (D) incorporated into the anaerobic adhesive. For accomplishing both the storage stability and setting properties of the anaerobic adhesive sheet, the capability of absorbing oxygen and the capability of forming organic peroxide in the compound (B) are required to be at a proper level. When the capability of absorbing oxygen and the capability of forming organic peroxide are too high, excess amount of organic peroxide is formed while the sheet is stored, and radical is not adequately consumed by ambient oxygen, or the anaerobic adhesive undergoes setting. When the above capabilities are too small, the setting hardly occurs, or the setting time increases. Therefore, the anaerobic adhesive sheet cannot be practically used. The organic peroxide generated from the conjugated double bond is assumed to be mostly hydroperoxide, and the capability of absorbing oxygen and the ability of forming peroxide, in the compound (B), are required to be at a proper level. Further, in addition to the reaction by the organic peroxide, the Diels-Alder reaction vigorously takes place between the conjugated double bond portion and the ethylenically unsaturated group to increase the molecular weight, which also has an effect on the setting.

The above-described setting reaction differs from a conventional simple anaerobically setting reaction. The anaerobic adhesive sheet of the present invention accomplishes both the storage stability and the setting properties, which has been difficult to accomplish so far. As an anaerobically setting composition, there is known a composition containing a polymerizable monomer or oligomer having a (meth)acryloyl group such as polyethylene glycol (meth)acrylate or epoxy acrylate, an organic peroxide such as benzoyl peroxide or cumene hydroxyperoxide and optionally a promoter and a stabilizer, as is disclosed in JP-B-2-5791. In this composition, the organic peroxide decomposes to generate a radical and a setting reaction takes place. However, the contradicting requirements of the storage stability and the setting properties cannot be satisfied, and it is difficult to obtain the storage stability as a sheet. In contrast, in the present invention, the compound (B) plays two roles as an absorbent of ambient oxygen to form an oxygen-free state and as a generator of an organic peroxide, and due to an efficient mechanism in which the gradual formation and decomposition of the organic peroxide is continuously repeated, the contradicting requirements of the storage stability and the setting properties are accomplished. Further, the present invention is clearly distinguishable from conventional anaerobic adhesives and anaerobic adhesive sheet in that the setting of the anaerobic adhesive of the present invention is promoted by a reaction inherent to a compound having a conjugated double bond such as the Diels-Alder reaction at room temperature. Further, the adhesive rubber-based resin (A), the compound (B) and the ethylenically unsaturated monomer or oligomer (C) form a microphase discrete (sea-island) structure whose matrix is formed of the adhesive rubber-based resin (A), in which the compound (B) and the ethylenically unsaturated monomer or oligomer (C) are present as spherical particles forming islands. Therefore, oxygen is supplied very moderately, and the rate of oxidation is also moderate, whereby the sharp increase of radical is prevented, which greatly serves to accomplish the storage stability and the setting properties as a sheet.

In the present invention, the adhesive rubber-based resin (A) includes an adhesive acryl polymer, natural and synthetic cis-1,4-polyisoprene rubbers, butyl rubber, halogenated butyl rubber, partially vulcanized butyl rubber, a styrene-butadiene-styrene block copolymer (SBS), a styrene-isoprene-styrene block copolymer (SIS), a styrene-ethylene-butylene-styrene block copolymer (SEBS), silicone rubber, chloroprene rubber, nitrile rubber and butadiene rubber. These polymers are called elastomers. An adhesive acryl polymer is particularly preferred as the adhesive rubber-based resin, since it can be produced as one having a desired structure and desired molecular weight, and since it can form an excellent microphase discrete structure with the compound (B) and the ethylenically unsaturated monomer or oligomer (C). The adhesive acryl polymer refers to a polymer which has a functional group such as hydroxy group, a tertiary amino group, a carboxyl group, an amide group, a nitrile group, or the like, and is generally used as an acrylic resin for adhesives. The acryl polymer having the above functional group is a copolymer formed from at least one monomer having the above functional group (hydroxyl, tertiary amino, carboxyl, amide or nitrile) and a monomer such as alkyl (meth)acrylate, vinyl acetate, vinyl propionate, vinyl ether or styrene.

The monomer having a hydroxy group includes 2-hydroxyethyl (meth)acrylate. 2-hydroxypropyl (meth)acrylate and N-methylolacrylamide. The monomer having a tertiary amino group includes dimethylaminoethyl (meth)acrylate and diethylaminomethyl (meth)acrylate. The monomer having a carboxyl group includes acrylic acid, methacrylic acid and maleic acid. The monomer having an amide group includes acrylamide, methacrylamide and N-methyl-(meth)acrylamide. The monomer having a nitrile group includes acrylonitrile, methacrylonitrile, crotononitrile and fumaronitrile. The alkyl (meth)acrylate includes methyl (meth)acrylate, butyl (meth)acrylate and 2-ethylhexyl (meth)acrylate. Other monomers generally used for an acryl polymer may be used for the synthesis of the polymer used in the present invention.

The acryl polymer is synthesized by a general radical polymerization. The reaction may be carried out by a known polymerization method such as a solution polymerization method, a bulk polymerization method or an emulsion polymerization method, while the solution polymerization is preferred since the reaction can be easily controlled and a next procedure can be directly taken. The solvent may be any solvent that can dissolve the adhesive rubber-based resin used in the present invention, such as methyl ethyl ketone, methyl isobutyl ketone, toluene, cellosolve, ethyl acetate and butyl acetate. These solvents may be used alone or in combination. The polymerization initiator used for the polymerization is not specially limited, and can be selected from known polymerization initiators including organic peroxides such as benzoyl peroxide, acetyl peroxide, methyl ethyl ketone peroxide and lauroyl peroxide; and azo initiators such as azobisisobutyronitrile.

The compound (B) used in the present invention has a conjugated double bond, allylcarbon or tertiary carbon, has both the capability of absorbing oxygen and the capability of forming organic peroxide, and exhibits an oxygen absorption amount of 0.1 to 3.0% (weight of absorbed oxygen/weight) and an active oxygen amount of 0.01 to 1.0% (weight of active oxygen/weight). The oxygen absorption amount and the active oxygen amount are determined by the following methods.

(1) Measurement of Oxygen Absorption Amount

A compound (B) sample is measured for a weight at 25° C. under a pressure of 300±25 psi, allowed to stand under the same conditions for 168 hours, and measured for a weight under the same conditions. The oxygen absorption amount is defined as a difference between the weight measured first and the weight measured after 168 hours. The compound (B) sample is prepared by milling a compound (B) into 200–300 mesh or forming it into a thin film having a thickness of 20–50 μm.

(2) Measurement of Active Oxygen

A compound (B) sample is dissolved in chloroform, an excess amount of potassium iodide as a reducing agent is added, and free iodine is titrated in a sodium thiosulfate solution. Glacial acetic acid and methanol are added as required. The compound (B) sample is prepared by milling the compound (B) into 200–300 mesh or forming it into a thin film having a thickness of 20–50 μm, and allowing it to stand at 60° C. for 10 days.

The compound (B) used in the present invention includes rosin, polymerized rosin, polyhydric alcohol esters of these, butadiene, cyclodienes such as cyclopentadiene, furans, and unsaturated higher fatty acids and triglycerides of these. Rosin, polymerized rosin and polyhydric alcohol esters of these are particularly preferred as the compound (B), since their double bond portions show the optimum capability of absorbing oxygen and the optimum capability of forming organic peroxide. The rosin includes wood rosin (oxygen absorption amount: 9.25%, active oxygen amount: 2.6% the parenthesized figures appearing below mean these amounts in this order) gum rosin, tall oil rosin and hydrogenated rosin. The polyhydric alcohol ester of rosin includes glycerin esters and pentaerythritol esters. The glycerin esters include Ester Gum 8D (5.05%, 0.56%) and Ester Gum 8L-JA (4.22%, 0.51%) (these two are rosin glycerin esters supplied by Hercules). The pentaerythritol esters include Petnalyn A-JA (1.80%, 0.10%), Pentalyn A-J, Ester R-5, Ester R-105 (1.05%, 0.56%), Pentalyn 485 and Pentalyn 4851 (these are all rosin pentaerythritol esters supplied by Hercules). The hydrogenated rosin includes Staybelite and Foral AX (supplied by Hercules). The hydrogenated rosin ester include methyl ester, triethylene glycol ester, glycerin ester and pentaerythritol ester of hydrogenated rosin. The hydrogenated rosin methyl ester includes Harcholin D (supplied by Hercules). The hydrogenated rosin triethylene glycol ester includes Staybelite Ester 3 (supplied by Hercules). The hydrogenated rosin glycerin ester includes Staybelite Ester 5J (<0.10%, 0.04%), Staybelite Ester 7, Staybelite Ester 10 (<0.10%, 0.04%) and Foral 85 (<0.10%, 0.12%, hydrogenated rosin ester supplied by Hercules). The hydrogenated rosin pentaerythritol ester includes Pentalin H (<0.10%, 0.26%) and Foral 105 (pentaerythritol ester supplied by Hercules). Dibasic acid modified rosin ester includes Pentalyn 4820, Pentalyn 4821, Pentalyn 4740 and Pentalyn 830 (these are all dibasic modified rosin esters supplied by Hercules). The polymerized rosin ester includes glycerin esters and pentaerythritol esters of polymerized rosin such as Ester Gum 10D (0.52%, 0.35%, polymerized rosin glycerin ester supplied by Hercules), Pentalyn C-J (0.15%, 0.18%), Pentalyn K and Pentalyn 2590 (0.30%, 0.07%, the last three are polymerized rosin pentaerythritol esters supplied by Hercules).

Of the above rosins, wood rosin, gum rosin and tall oil rosin are liable to show too large an oxygen absorption amount, and hydrogenated rosin is liable to show too small an oxygen absorption amount. These rosins are hence hardly used alone as the compound (B). Polyhydric alcohol esters of these rosins are also liable to show the same tendency in oxygen absorption amount, while some of them show a proper oxygen absorption amount. For example, rosin pentaerythritol ester such as Ester R105 may be used as the compound (B). Polymerized rosins and polymerized rosin polyhydric alcohol esters generally show an oxygen absorption amount of 0.1 to 3.0% (weight of absorbed oxygen/compound weight) and an active oxygen amount of 0.001 to 0.5% (weight of active oxygen/compound weight), and most of them are used as the compound (B) in the present invention. Polymerized rosin such as Dymerex Rosin and polymerized rosin pentaerythritol ester such as Pentalyn C-J are particularly preferred as the compound (B). The amount of the compound (B) per 100 parts by weight of the adhesive rubber-based resin (A) is 30 to 150 parts by weight, preferably 40 to 70 parts by weight. The above weight range of the compound (B) is preferable for accomplishing both the setting properties and the storage stability. A rosin compound may be used as a tackifier, while, in the present invention, the rosin compound is used for its reactivity in the reaction for forming organic peroxide and the Diels-Alder reaction. Therefore, the use of rosin in the present invention is essentially different from the conventional use thereof as a tackifier.

Further, the compound (B) used in the present invention includes a terpene resin, a terpene phenol resin, a rosin phenol resin, an aromatic compound modified terpene resin, a hydrogenated terpene resin, an aliphatic petroleum resin, an aromatic petroleum resin and a copolymer petroleum resin. A terpene phenol resin and an aliphatic petroleum resin are particularly preferred as the compound (B) in the present invention, since their conjugated double bond portions show the optimum capability of absorbing oxygen and the optimum capability of forming organic peroxide. The terpene resin includes PX, N, A and Z series of YS resins (supplied by Yasuhara Chemical Co., Ltd.) and A, C and S series of Piccolyte (supplied by Hercules). The terpene phenol resin includes T, S and Mighty Ace series of YS polymers 2000 (supplied by Yasuhara Chemical Co., Ltd.), and Picofyn T-125 and A-135 (supplied by Hercules). The rosin phenolic resin includes Tamanol 803 (supplied by Arakawa Chemical Industries, Inc.). The aromatic compound modified terpene resin includes TO series of YS resins (supplied by Yasuhara Chemical Co., Ltd.). The hydrogenated terpene resin includes P and P series of Clearone (supplied by Yasuhara Chemical Co., Ltd.). The aliphatic petroleum resin includes Piccopale 100, Piccotacc 95, B and 115 (supplied by Hercules) and Kraton A, B, C, D, M, N, U and RX (supplied by Nippon Zeon Co., Ltd.). The aromatic petroleum resin includes A and D seriesof Piccolastic and Crystalex series (supplied by Hercules), and Petrosin series (supplied by Mitsui Petrochemical Industries, Ltd.). The copolymer petroleum resin includes Piccotac HM2162 and Herccotac 1148 and 1149 (supplied by Hercules).

The ethylenically unsaturated monomer (C) includes poly(meth)acrylates or mono(meth)acrylates of polyhydric alcohols such as diethylene glycol dimethacrylate, diethylene glycol dimethacrylate, triethylene glycol dimethacrylate, tetraethylene glycol dimethacrylate, polyethylene glycol di(meth)acrylate, trimethylolpropane tri(meth)acrylate, pentaerythritol tetra(meth)acrylate and dipentaerythritol hexa(meth)acrylate. The ethylenically unsaturated oligomer (C) includes polyester, polyether, polyurethane, epoxyoligomer, polysulfide, polycaprolactone and polycarbonate poly(meth)acrylates or mono(meth)acrylates having a number average molecular weight of 400 to 10,000, preferably up to 5,000. Particularly preferred are unsaturated polyester oligomers obtained by the ring-opening polymerization of a compound having a hydroxyl group, cyclic acid anhydride and ethylenically unsaturated epoxide.

The above compound having a hydroxy group includes alcohols such as methyl alcohol, ethyl alcohol, propyl alcohol and isopropyl alcohol; low-molecular weight diols such as ethylene glycol, propylene glycol, 1,4-butylene alcohol, 1,3-butylene alcohol, butenediol, hexanediol, cyclohexanediol, bisphenol A, bisphenol F, diethylene glycol and dipropylene glycol; and high-molecular weight diols such as polyethylene glycol, polypropylene glycol, polypropylene-polyethylene glycol, polybutylene glycol, polyetherdiol and polyesterdiol. Alcohol compounds having at least three hydroxyl groups such as glycerin, trimethylol propane and 1,2,6-hexanetriol may be used, while diols are preferred. The cyclic acid anhydride includes maleic anhydride, phthalic anhydride, anhydrous 1,2-cyclohexanedicarboxylic acid, anhydrous cis-4-cyclohexane1,2-dicarboxylic acid, itaconic anhydride, citraconic anhydride and succinic anhydride. The ethylenically unsaturated epoxide includes glycidyl acrylate and glycidyl methacrylate.

The amount of the monomer or oligomer (C) is preferably set such that the amount of the ethylenically unsaturated group of the monomer or oligomer (C) per mole of the active hydrogen contained in the compound (B) is 2 to 140 mol. When the amount of the ethylenically unsaturated group of the monomer or oligomer (C) is larger than 140 mol, the setting properties are poor, and the balance between the adhesion properties and the setting properties is also poor. For accomplishing both the storage stability and setting properties of the anaerobic adhesive sheet and for accomplishing the adhesion properties before the setting and the adhesion strength after the setting, the adhesive rubber-based resin (A), the compound (B) and the monomer or oligomer (C) are required to form a microphase discrete structure in which the adhesive rubber-based resin (A) is present as a matrix. In particular, when the amount of the monomer or oligomer (C) per 100 parts by weight of the adhesive rubber-based resin is 5 to 100 parts by weight, there is obtained an excellent balance between the storage stability and the setting properties.

The organic peroxide (D) includes dialkyl peroxides such as di-tert-butyl peroxide, tert-butylcumyl peroxide and dicumyl peroxide; diacyl peroxides such as acetyl peroxide, lauroyl peroxide and benzoyl peroxide; ketone peroxides such as methyl ethyl ketone peroxide, cyclohexanone peroxide and methyl cyclohexanone peroxide; peroxy ketals such as 1,1-bis(tert-butylperoxy)cyclohexane; hydroperoxides such as tert-butyl hydroperoxide, cumene hydroperoxide, 1,1,3,3-tetramethylbutyl hydroperoxide, p-menthane hydroperoxide, diisopropylbenzene hydroperoxide and 2,5-dimethylhexane-2,5-dihydroperoxide; and peroxyesters such as tert-butylperoxyacetate, tert-butylperoxy-2-ethylhexanoate and tert-butylperoxybenzoate. Of these, benzoyl peroxide is preferred since it serves to give an anaerobic adhesive sheet having a good balance between the setting properties and the storage stability. The amount of the organic peroxide (D) per 100 parts by weight of the adhesive rubber-based resin (A) is generally 0.1 to 15 parts by weight, preferably 0.5 to 10 parts by weight.

For improving the adhesion properties of the anaerobic adhesive composition before the setting and particularly for improving the cohesion thereof, a polyisocyanate (E) may be added to partially crosslink the adhesive rubber-based resin (A), the compound (B) and the monomer or oligomer (C). The polyisocyanate includes diisocyanates such as tolylene diisocyanate, 4,4'-diphenylmethane diisocyanate, hexamethylene diisocyanate, m-xylene diisocyanate, p-xylene diisocyanate, 1,5-naphthalene diisocyanate, isophorone diisocyanate, lysine diisocyanate, hydrogenated 4,4'-diphenylmethane diisocyanate and hydrogenated tolylene diisocyanate; and an adduct of any one of these with glycol or diamine, having isocyanate group on each terminal. These polyisocyanates may be used alone or in combination. A polyisocyanate having three or more functional groups such as triphenylmethane triisocyanate or polymethylene polyphenylene isocyanate may be used in combination with the above polyisocyanate. The amount of the polyisocyanate (E) is 0.05 to 2.0 parts by weight, preferably 0.1 to 1.5 parts by weight, per 100 parts by weight of the anaerobic adhesive composition containing the adhesive rubber-based resin (A), the compound (B), the monomer or oligomer (C) and the peroxide (D).

Further, for improving the adhesion properties of the anaerobic adhesive composition before the setting and particularly for improving the cohesion thereof, polyepoxy compound (G) may be added to partially crosslink the adhesive rubber-based resin (A), the compound (B) and the monomer or oligomer (C). The polyepoxy compound (G) includes sorbitol polyglycidyl ester, sorbitan polyglycidyl ester, polyglycerol polyglycidyl ester, pentaerythritol polyglycidyl ester, diglycerol polyglycidyl ester, triglycidyl tris(2-hydroxyethyl)isocyanurate, glycerol polyglycidyl ester, trimetylolpropane polyglycidyl ester, resorcin diglycidyl ester, neopentyl glycol diglycidyl ester, 1,6-hexanediol diglycidyl ester, ethylene polyethylene glycol diglycidyl ester, propylene polypropylene glycol diglycidyl ester, polytetramethylene glycol diglycidyl ester, diglycidyl adipate, diglycidyl phthalate, hydroquinone diglycidyl ester and bisphenol S diglycidyl ester. These polyepoxy compounds may be used alone or in combination. The amount of the polyepoxy compound (G) is 0.05 to 2.0 parts by weight, preferably 0.1 to 1.5 parts by weight, per 100 parts by weight of the anaerobic adhesive composition containing the adhesive rubber-based resin (A), the compound (B), the monomer or oligomer (C) and the peroxide (D).

The anaerobic adhesive of the present invention may contain a polymerization inhibitor (F). The polymerization inhibitor includes hydroquinone, hydroquinone monomethyl ether, tert-butyl catechol, p-benzoquinone, 2-mercaptobenzoimidazole, 2,2,4-trimethyl-1,2-dihydroquinoline, N,N-di-β-naphthyl-p-phenylenediamine, 4,4-butylidene-bis(3-methyl-6-tert-butyl)phenol, phenyl-β-naphthylamine, 2,2-methylenebis(4-methyl-6-tertbutyl)phenol, 2-mercaptobenzoimidazole, diphenylpicrylhydrazyl, galvinoxyl, 1,3,5-triphenyl pheldazile, N-nitrosophenylhydroxylamine aluminum salt, sulfur and a nitro compound. Of these polymerization inhibitors, N-nitrosophenylhydroxylamine aluminum is particularly preferred since it serves to accomplish both the storage stability and setting properties of the anaerobic adhesive sheet. The storage stability is remarkably improved by the polymerization inhibitor (F), while the time required for the setting tends to increase. The amount of the polymerization inhibitor (F) is 0.001 to 1.0 parts by weight, preferably 0.005 to 0.5 parts by weight, per 100 parts by weight of the anaerobic adhesive composition containing the adhesive rubber-based resin (A), the compound (B), the monomer or oligomer (C) and the peroxide (D).

The anaerobic adhesive of the present invention may contain a pigment, a dye, an inorganic filler, a metal powder, a silane coupling agent and a tackifier as required. The anaerobic adhesive of the present invention is coated, for example, on a peel liner formed of a silicone-treated paper or cloth substrate and the solvent is dried off as required. The so-prepared anaerobic adhesive substrate is, for example, cut in the form of a sheet as required, and prepared in the form of a double coated or single coated sheet as required. The anaerobic adhesive may be coated on an air-free, air-impermeable substrate such as cellophane or a polyethylene terephthalate film. Further, the anaerobic adhesive may be used in the form of a sheet prepared by impregnating an air-permeable substrate such as unwoven fabric. The so-obtained double coated anaerobic adhesive sheet is used in such a manner that an article is attached to other article of the same or different kind through the double coated anaerobic adhesive sheet, and the anaerobic adhesive sheet temporarily bonds these two articles and undergoes setting while it is left at room temperature, whereby the two articles are firmly bonded. The anaerobic adhesive of the present invention is set in the period of several hours to one week to reach the strength sufficient for practical use.

The present invention will be explained more in detail hereinafter with reference to Examples, in which "part" stands for "part by weight" and "%" stands for "% by weight".

| Synthesis of adhesive rubber-based resin (A) | |
|---|---|
| Polymer 1 | |
| Butyl acrylate | 92.0 parts |
| Acrylamide | 2.8 parts |
| 2-Hydroxyethyl methacrylate | 5.2 parts |
| Azobisisobutyronitrile | 0.2 part |
| Ethyl acetate | 150.0 parts |

In a nitrogen atmosphere, 125 parts of a composition containing the above components in amounts shown above was heated to 80° C., and 125 parts of a composition containing the same components in the same amounts was dropwise added to the above-heated composition. Then, the mixture was refluxed under heat at 80° C. for 12 hours and cooled to give a solution of Polymer 1 (solid content 40%).

| Polymer 2 | |
|---|---|
| Butyl acrylate | 93.5 parts |
| Acrylic acid | 1.4 parts |
| 2-Hydroxyethyl methacrylate | 5.1 parts |
| Azobisisobutyronitrile | 0.2 part |
| Ethyl acetate | 150.0 parts |

In a nitrogen atmosphere, 125 parts of a composition containing the above components in amounts shown above was heated to 80° C., and 125 parts of a composition containing the same components in the same amounts was dropwise added to the above-heated composition. Then, the mixture was refluxed under heat at 80° C. for 12 hours and cooled to give a solution of Polymer 2 (solid content 40%).

| Polymer 3 | |
|---|---|
| Cariflex TR-1101 (SBS, adhesive rubber-based polymer, supplied by Shell Chemical) | 40.0 parts |
| Toluene | 60.0 parts |

A mixture of the above components was stirred in a nitrogen atmosphere at 50° C. to give a solution of Polymer 3 (solid content 40%).

| Preparation of compound (B) | |
|---|---|
| Rosin compound 1 | |
| Pentalyn 2590 (Polymerized rosin pentaerythritol ester, supplied by Hercules) | 40.0 parts |
| Ethyl acetate | 60.0 parts |

A mixture of the above components was stirred at room temperature for 1 hour to give a solution of Rosin compound 1 (solid content 40%).

| Rosin compound 2 | |
| --- | --- |
| Ester R105 (Rosin pentaerythritol ester, supplied by Hercules) | 40.0 parts |
| Ethyl acetate | 60.0 parts |

A mixture of the above components was stirred at room temperature for 1 hour to give a solution of Rosin compound 2 (solid content 40%).

| Rosin compound 3 | |
| --- | --- |
| Pentalyn C-J (Polymerized rosin pentaerythritol ester, supplied by Hercules) | 40.0 parts |
| Ethyl acetate | 60.0 parts |

A mixture of the above components was stirred at room temperature for 1 hour to give a solution of Rosin compound 3 (solid content 40%).

| Rosin compound 4 | |
| --- | --- |
| Chinese rosin | 40.0 parts |
| Ethyl acetate | 60.0 parts |

A mixture of the above components was stirred at room temperature for 1 hour to give a solution of Rosin compound 4 (solid content 40%).

| Rosin compound 5 | |
| --- | --- |
| Foral 85 (hydrogenated rosin glycerin ester, supplied by Hercules) | 40.0 parts |
| Ethyl acetate | 60.0 parts |

A mixture of the above components was stirred at room temperature for 1 hour to give a solution of Rosin compound 5 (solid content 40%).

| Terpene compound 1 | |
| --- | --- |
| YS Polyester 2130 (Terpene phenol copolymer, supplied by Yasuhara Chemical Co., Ltd.) | 40.0 parts |
| Ethyl acetate | 60.0 parts |

A mixture of the above components was stirred at room temperature for 1 hour to give a solution of Terpene compound 1 (solid content 400%).

| Terpene compound 2 | |
| --- | --- |
| Mighty Ace G (Terpene phenol copolymer, supplied by Yasuhara Chemical Co., Ltd.) | 40.0 parts |
| Ethyl acetate | 60.0 parts |

A mixture of the above components was stirred at room temperature for 1 hour to give a solution of Terpene compound 2 (solid content 40%).

| Petroleum resin compound 1 | |
| --- | --- |
| Piccopale (Aliphatic petroleum resin, supplied by Hercules) | 40 parts |
| Ethyl acetate | 60.0 parts |

A mixture of the above components was stirred at room temperature for 1 hour to give a solution of Petroleum resin compound 1 (solid content 40%).

| Petroleum resin compound 2 | |
| --- | --- |
| Piccotac (Aliphatic petroleum resin, supplied by Hercules) | 40 parts |
| Ethyl acetate | 60.0 parts |

A mixture of the above components was stirred at room temperature for 1 hour to give a solution of Petroleum resin compound 2 (solid content 40%).

Preparation of solution of monomer or oligomer (C)

| Unsaturated polyester oligomer 1 | |
| --- | --- |
| Ethylene glycol | 2.0 parts |
| Hexaydrophthalic anhydride | 51.0 parts |
| Glycidyl methacrylate | 47.0 parts |
| N,N-Dimethylbenzylamine | 0.9 parts |
| Hydroquinone | 0.2 part |
| Ethyl acetate | 25.0 parts |

The above components were mixed, and in air atmosphere, the mixture was allowed to react at 80° C. for 10 hours and then cooled. Then, 125 parts of ethyl acetate was added to give a solution (solid content 40%) of Unsaturated polyester oligomer 1 (number average molecular weight: 1,670).

| Unsaturated polyester oligomer 2 | |
| --- | --- |
| Ethylene glycol | 2.5 parts |
| Succinic anhydride | 40.3 parts |
| Glycidyl methacrylate | 57.2 parts |
| N,N-Dimethylbenzylamine | 1.1 parts |
| Hydroquinone | 0.2 part |
| Ethyl acetate | 25.0 parts |

The above components were mixed, and in air atmosphere, the mixture was allowed to react at 80° C. for 10 hours and then cooled. Then, 125 parts of ethyl acetate was added to give a solution (solid content 40%) of Unsaturated polyester oligomer 2 (number average molecular weight: 2,050).

| Epoxy acrylate 1 | |
| --- | --- |
| SP1509 (Epoxy acrylate, supplied by Showa Kobunshi K.K.) | 40.0 parts |
| Ethyl acetate | 60.0 parts |

A mixture of the above components was stirred at room temperature to give a solution of Epoxy acrylate 1 (solid content 40%).

EXAMPLE 1

45.0 Parts of a solution of Polymer 1, 30.0 parts of a solution of Rosin compound 1, 25.0 parts of a solution of Unsaturated polyester oligomer 1 and 3.0 parts of Nyper BMT-K40 (a solution of 40% of benzoyl peroxide in xylene, supplied by Nippon Oil & Fats Co., Ltd.) were fully mixed, and the mixed solution was coated on a silicone-treated, polyethylene-coated woodfree paper sheet ("peel liner" hereinafter) such that the dry thickness was 30 μm. Then, the coating was dried at 60° C. for 3 minutes, and then a peel liner was stacked on the coating to give an adhesive sheet. The so-obtained adhesive sheet was measured for adhesion properties before setting (peel-adhesion strength, tack and holding strength) and a shear adhesion strength after setting and also evaluated for storage stability by the following methods. Table 1 shows the results.

(1) Peel-Adhesion Strength Before Setting

One peel liner of an adhesive sheet was peeled off, and a 50 μm thick polyethylene terephthalate sheet was attached to the adhesive surface. The adhesive sheet was cut to a width of 25 mm, and the other peel liner was peeled off. The so-prepared adhesive surface was attached to stainless steel plate (SUS304) polished with a #280 sand paper and allowed to stand for 30 minutes, and then the adhesive was measured for 180 degrees peel-adhesion strength at 25° C. at a relative humidity of 65% at a peel rate of 300 mm/minute.

(2) Tack Before Setting

An adhesive sheet was attached to a slope having a gradient angle of 30 degrees, and a peel line on the surface was peeled off. Then, a stainless steel ball was allowed to roll along the slope from 10 cm away, as an approach distance, from the top end of the adhesive surface at 25° C. at a relative humidity of 65%, and a largest ball number was determined which stopped within 10 cm inward from the top end of the adhesive surface. 31 Balls numbered from 1/16 to 1 (ball numbers) were expressed by figures calculated by multiplying the ball numbers by 32.

(3) Holding Strength

One peel liner of an adhesive sheet was peeled off, and a 50 μm thick polyethylene terephthalate sheet was attached to the adhesive surface. The adhesive sheet was cut to a width of 25 mm and a length of 100 mm, and the other peel liner was peeled off. That portion of the so-prepared adhesive surface which had a size of 25 mm×25 mm was attached to stainless steel plate (SUS304) polished with a #280 sand paper, and a time (second) was measured which passed until the adhesive sheet dropped from the stainless steel plate at 40° C. under a load of 1 kg.

(4) Shear Adhesion Strength After Setting

An adhesive sheet having a size of 10 mm×10 mm was prepared. One peel liner of the adhesive sheet was peeled off, and the adhesive surface was attached to one top end side of one aluminum plate having a length of 50 mm, a width of 10 mm and a thickness of 0.5 mm, and the other peel liner was peeled off. The later-prepared adhesive surface was attached to another aluminum plate having the same size with taking care that no air bubbles were caught in the interface. The so-bonded two aluminum plates were allowed to stand at 20° C. for 1 week to set the adhesive, and then measured for a shear strength at a draw rate of 5 mm/minute at 25° C. at a relative humidity of 65%.

(5) Storage Stability of Adhesive Sheet

One peel liner of an adhesive sheet was peeled off, and a 50μm thick, silicone-treated polyethylene terephthalate film was attached to the adhesive surface. The other peel liner was peeled off, and another 50 μm thick, silicone-treated polyethylene terephthalate film was attached to the so-prepared adhesive surface. The so-obtained laminate was stored at 50° C. for 2 weeks. Thereafter, the adhesive sheet was evaluated for storage stability on the basis of adhesion which the adhesive sheet retained. An adhesive sheet which retained no adhesion properties was taken as defective (marked X), and an adhesive sheet which retained sufficient adhesion properties was taken as excellent (marked A).

EXAMPLE 2

45.0 Parts of a solution of Polymer 1, 30.0 parts of a solution of Rosin compound 1, 25.0 parts of a solution of Unsaturated polyester oligomer 1 and 3.0 parts of Nyper BMT-K40 (a solution of 40% of benzoyl peroxide in xylene, supplied by Nippon Oil & Fats Co., Ltd.) were fully mixed. Further, and 0.3 part of Coronate L (adduct polyisocyanate, supplied by Nippon Polyurethane Industry Co., Ltd.) was added. An adhesive sheet was prepared from the above-obtained solution in the same manner as in Example 1, and aged at 50° C. for 3 days. The so-obtained adhesive sheet was measured for adhesion properties before setting and shear adhesion strength after setting, and evaluated for storage stability. Table 1 shows the results.

EXAMPLE 3

45.0 Parts of a solution of Polymer 1, 30.0 parts of a solution of Rosin compound 1, 25.0 parts of a solution of Unsaturated polyester oligomer 1, 3.0 parts of Nyper BMT-K40 (a solution of 40% of benzoyl peroxide in xylene, supplied by Nippon Oil & Fats Co., Ltd.) and 0.3 part of Coronate L (adduct polyisocyanate, supplied by Nippon Polyurethane Industry Co., Ltd.) were homogeneously mixed. Further, 0.01 part of N-nitrosophenylhydroxylamine aluminum salt as a polymerization inhibitor was added. An adhesive sheet was prepared from the above-obtained solution in the same manner as in Example 2. The so-obtained adhesive sheet was measured for adhesion properties before setting and shear adhesion strength after setting, and evaluated for storage stability. Table 1 shows the results.

EXAMPLE 4-11

A solution of Polymer, a solution of Rosin compound, a solution of Unsaturated polyester oligomer or Epoxy acrylate and Nyper BMT-K40 (a solution of 40% of benzoyl peroxide in xylene, supplied by Nippon Oil a Fats Co., Ltd.) were fully mixed in amounts as shown in Table 1. Then, 0.3 part of Coronate L (adduct polyisocyanate, supplied by Nippon Polyurethane Industry Co., Ltd.) was homogeneously mixed, and 0.01 part of N-nitrosophenylhydroxylamine aluminum salt as a polymerization inhibitor was added. An adhesive sheet was prepared from the above-obtained solution in the same manner as in Example 2. The adhesive sheets obtained in the above manner were measured for adhesion properties before setting and shear adhesion strength after setting, and evaluated for storage stability. Table 1 shows the results.

COMPARATIVE EXAMPLE 1

45.0 Parts of a solution of Polymer 1, 30.0 parts of a solution of Rosin compound 4 which showed an oxygen absorption amount of more than 3.0% and an active oxygen amount of more than 1.0%, 20 parts of a solution of Unsaturated polyester oligomer 1 and 3.0 parts of Nyper BMT-K40 (a solution of 40% of benzoyl peroxide in xylene, supplied by Nippon Oil & Fats Co., Ltd.) were fully mixed, and then 0.3 part of Coronate L (adduct polyisocyanate, supplied by Nippon Polyurethane Industry Co., Ltd.) and 0.01 part of N-nitrosophenylhydroxylamine aluminum salt were added. An adhesive sheet was prepared from the above-obtained solution in the same manner as in Example 2. The so-obtained adhesive sheet was measured for adhesion properties before setting and shear adhesion strength after setting, and evaluated for storage stability. Table 1 shows the results.

COMPARATIVE EXAMPLE 2

45.0 Parts of a solution of Polymer 1, 30.0 parts of a solution of Rosin compound 5 which showed an oxygen absorption amount of less than 0.01% and an active oxygen amount of 0.005% or less, 25 parts of a solution of Unsaturated polyester oligomer 1 and 3.0 parts of Nyper BMT-K40 (a solution of 40% of benzoyl peroxide in xylene, supplied by Nippon Oil & Fats Co., Ltd.) were fully mixed, and then 0.3 part of Coronate L (adduct polyisocyanate, supplied by Nippon Polyurethane Industry Co., Ltd.) and 0.01 part of N-nitrosophenylhydroxylamine aluminum salt were added. An adhesive sheet was prepared from the above-obtained solution in the same manner as in Example 2. The so-obtained adhesive sheet was measured for adhesion properties before setting and shear adhesion strength after setting, and evaluated for storage stability. Table 1 shows the results.

COMPARATIVE EXAMPLE 3

45.0 Parts of a solution of Polymer 1, 30.0 parts of a solution of Rosin compound 1, 75.0 parts of a solution of Unsaturated polyester oligomer 1 and 3.0 parts of Nyper BMT-K40 (a solution of 40% of benzoyl peroxide in xylene, supplied by Nippon Oil & Fats Co., Ltd.) were fully mixed, and then 0.3 part of Coronate L (adduct polyisocyanate, supplied by Nippon Polyurethane Industry Co., Ltd.) and 0.01 part of N-nitrosophenylhydroxylamine aluminum salt were added. An adhesive sheet was prepared from the above-obtained solution in the same manner as in Example 2. The so-obtained adhesive sheet was measured for adhesion properties before setting and shear adhesion strength after setting, and evaluated for storage stability. Table 1 shows the results.

COMPARATIVE EXAMPLE 4

45.0 Parts of a solution of Polymer 1, 90.0 parts of a solution of Rosin compound 1, 25 parts of a solution of Unsaturated polyester oligomer 1 and 3.0 parts of Nyper BMT-K40 (a solution of 40% of benzoyl peroxide in xylene, supplied by Nippon Oil a Fats Co., Ltd.) were fully mixed, and then 0.3 part of Coronate L (adduct polyisocyanate, supplied by Nippon Polyurethane Industry Co., Ltd.) and 0.01 part of N-nitrosophenylhydroxylamine aluminum salt were added. An adhesive sheet was prepared from the above-obtained solution in the same manner as in Example 2. The so-obtained adhesive sheet was measured for adhesion properties before setting and shear adhesion strength after setting, and evaluated for storage stability. Table 1 shows the results.

TABLE 1

| | Composition (weight ratio) | | | | | | | | | | | | |
|---|---|---|---|---|---|---|---|---|---|---|---|---|---|
| | Adhesive rubber-based resin (A) Polymer | | | Compound (B) Rosin compound | | | | | Monomer or or oligomer (C) | | Organic peroxide (D) | Polyisocyanate (E) | Polymerization inhibitor (F) |
| | | | | | | | | | Polyester oligomer | Epoxy acrylate | | | |
| | 1 | 2 | 3 | 1 | 2 | 3 | 4 | 5 | 1 | 2 | | | |
| Ex. 1 | 45 | | | 30 | | | | | 25 | | 3 | no | no |
| Ex. 2 | 45 | | | 30 | | | | | 25 | | 3 | yes | no |
| Ex. 3 | 45 | | | 30 | | | | | 25 | | 3 | yes | yes |
| Ex. 4 | 45 | | | | 30 | | | | 25 | | 3 | yes | yes |
| Ex. 5 | 45 | | | | | 30 | | | 25 | | 3 | yes | yes |
| Ex. 6 | | 45 | | 30 | | | | | 25 | | 3 | yes | yes |
| Ex. 7 | | 45 | | | 30 | | | | 25 | | 3 | yes | yes |
| Ex. 8 | | 45 | | | | 30 | | | 25 | | 3 | yes | yes |
| Ex. 9 | 45 | | | 30 | | | | | | 25 | 3 | yes | yes |
| Ex. 10 | 45 | | | 30 | | | | | | 25 | 3 | yes | yes |
| Ex. 11 | | | 45 | 30 | | | | | 25 | | 3 | yes | yes |
| CEx. 1 | 45 | | | | | | 30 | | 25 | | 3 | yes | yes |
| CEx. 2 | 45 | | | | | | | 30 | 25 | | 3 | yes | yes |
| CEx. 3 | 45 | | | 30 | | | | | 75 | | 3 | yes | yes |
| CEx. 4 | 45 | | | 90 | | | | | 25 | | 3 | yes | yes |

| | Properties and amount of Compound (B) | | | | Before setting | | | After setting |
|---|---|---|---|---|---|---|---|---|
| | Compound (B) | | | | | | | |
| | Oxygen absorption amount %, g/g | Active oxygen amount %, g/g | Mole of (C) per mole of active oxygen | Storage stability of adhesive sheet | Peel-adhesion strength g/25 mm-wide | Tack | Holding strength (second) | Shear adhesion strength (kg/cm²) |
| Ex. 1 | 0.30 | 0.07 | 63.0 | A | 1,990 | 7 | 1,380 | 25.0 |
| Ex. 2 | 0.30 | 0.07 | 63.0 | A | 1,630 | 3 | >24 hours | 29.6 |
| Ex. 3 | 0.30 | 0.07 | 63.0 | A | 1,600 | 3 | >24 hours | 28.4 |
| Ex. 4 | 1.50 | 0.56 | 7.9 | A | 1,600 | 3 | >24 hours | 30.8 |
| Ex. 5 | 0.15 | 0.18 | 24.5 | A | 1,640 | 3 | >24 hours | 31.1 |

TABLE 1-continued

| | | | | | | | | |
|---|---|---|---|---|---|---|---|---|
| Ex. 6 | 0.30 | 0.07 | 63.0 | A | 1,530 | 4 | >24 hours | 27.6 |
| Ex. 7 | 1.50 | 0.56 | 7.9 | A | 1,520 | 3 | >24 hours | 28.0 |
| Ex. 8 | 0.15 | 0.18 | 24.5 | A | 1,510 | 3 | >24 hours | 27.4 |
| Ex. 9 | 0.30 | 0.07 | 76.0 | A | 1,610 | 4 | >24 hours | 25.1 |
| Ex. 10 | 0.30 | 0.07 | 83.8 | A | 1,660 | 5 | >24 hours | 33.1 |
| Ex. 11 | 0.30 | 0.07 | 63.0 | A | 1,830 | 4 | >24 hours | 30.0 |
| CEx. 1 | >5.0 | >2.0 | — | X | 1,890 | 4 | >24 hours | 26.8 |
| CEx. 2 | <0.1 | 0.12 | — | A | 1,910 | 3 | >24 hours | 5.3 |
| CEx. 3 | 0.30 | 0.07 | 189.0 | X | 1,050 | <3 | >24 hours | 5.9 |
| CEx. 4 | 0.30 | 0.07 | — | X | 1,130 | <3 | >24 hours | 24.5 |

Ex. = Example, CEx. = Comparative Example

EXAMPLES 12–15

A solution of Polymer, a solution of Terpene compound or Petroleum resin compound, a solution of Unsaturated polyester oligomer and Nyper BMT-K40 (a solution of 40% of benzoyl peroxide in xylene, supplied by Nippon Oil & Fats Co., Ltd.) were fully mixed in amounts as shown in Table 2. Then, 0.3 part of Coronate L (adduct polyisocyanate, supplied by Nippon Polyurethane Industry Co., Ltd.) was homogeneously mixed, and 0.01 part of N-nitrosophenylhydroxylamine aluminum salt as a polymerization inhibitor was added. An adhesive sheet was prepared from the above-obtained solution in the same manner as in Example 2. The adhesive sheets obtained in the above manner were measured for adhesion properties before setting and shear adhesion strength after setting, and evaluated for storage stability. Table 2 shows the results.

Nippon Oil & Fats Co., Ltd.) were fully mixed in amounts as shown in Table 3. Then, 0.3 part of a solution of 40% of Denacol EX313 (glycerol polyglycidyl ester, supplied by Nagoya Chemical Ltd.) in ethyl acetate was homogeneously mixed therewith, and 0.01 part of N-nitrosophenylhydroxylamine aluminum salt as a polymerization inhibitor was added. An adhesive sheet was prepared from the above-obtained solution in the same manner as in Example 2. The adhesive sheets obtained in the above manner were measured for adhesion properties before setting and shear adhesion strength after setting, and evaluated for storage stability. Table 3 shows the results.

TABLE 2

| | Composition (weight ratio) | | | | | | | | | | | |
|---|---|---|---|---|---|---|---|---|---|---|---|---|
| | Adhesive rubber-based resin (A) Polymer | | | Compound (B) | | | | Monomer or oligomer (C) | | | Organic peroxide (D) | Polyisocyanate (E) | Polymerization inhibitor (F) |
| | | | | Terpene compound | | Petroleum resin compound | | Polyester oligomer | | Epoxy acrylate | | | |
| | 1 | 2 | 3 | 1 | 2 | 1 | 2 | 1 | 2 | | | | |
| Ex. 12 | 45 | | | 30 | | | | 25 | | | 3 | yes | yes |
| Ex. 13 | 45 | | | | 30 | | | 25 | | | 3 | yes | yes |
| Ex. 14 | 45 | | | | | 30 | | 25 | | | 3 | yes | yes |
| Ex. 15 | 45 | | | | | | 30 | 25 | | | 3 | yes | yes |

| | Properties and amount of Compound (B) | | | | Before setting | | | After setting Shear adhesion strength (kg/cm²) |
|---|---|---|---|---|---|---|---|---|
| | Oxygen absorption amount %, g/g | Active oxygen amount %, g/g | Mole of (C) per mole of active oxygen | Storage stability of adhesive sheet | Peel-adhesion strength g/25 mm-wide | Tack | Holding strength (second) | |
| Ex. 12 | 1.10 | 0.36 | 12.2 | A | 1,800 | 3 | >24 hours | 32.4 |
| Ex. 13 | 1.05 | 0.35 | 12.6 | A | 1,770 | 3 | >24 hours | 31.8 |
| Ex. 14 | 1.23 | 0.41 | 10.8 | A | 1,450 | 3 | >24 hours | 30.1 |
| Ex. 15 | 1.17 | 0.39 | 11.3 | A | 1,520 | 4 | >24 hours | 28.6 |

Ex. = Example, CEx. = Comparative Example

EXAMPLES 16–21

A solution of Polymer, a solution of Rosin compound, Terpene compound or Petroleum resin compound, a solution of Unsaturated polyester oligomer and Nyper BMT-K40 (a solution of 40% of benzoyl peroxide in xylene, supplied by

TABLE 3

| | Composition (weight ratio) | | | | | | | | | |
|---|---|---|---|---|---|---|---|---|---|---|
| | Adhesive rubber-resin (A) Polymer | Rosin compound | | Compound (B) Terpene compound | | Petroleum compound | | Monomer or oligomer (C) Polyester oligomer | Organic peroxide | Polyepoxy | Polymerization inhibitor |
| | 2 | 1 | 2 | 1 | 2 | 1 | 2 | 1 | (D) | (E) | (F) |
| Ex. 16 | 45 | 30 | | | | | | 25 | 3 | yes | yes |
| Ex. 17 | 45 | | 30 | | | | | 25 | 3 | yes | yes |
| Ex. 18 | 45 | | | 30 | | | | 25 | 3 | yes | yes |
| Ex. 19 | 45 | | | | 30 | | | 25 | 3 | yes | yes |
| Ex. 20 | 45 | | | | | 30 | | 25 | 3 | yes | yes |
| Ex. 21 | 45 | | | | | | 30 | 25 | 3 | yes | yes |

| | Properties and amount of Compound (B) | | | | | | | |
|---|---|---|---|---|---|---|---|---|
| | Compound (B) | | | | Before setting | | | After setting Shear adhesion strength (kg/cm$^2$) |
| | Oxygen absorption amount %, g/g | Active oxygen amount %, g/g | Mole of (C) per mole of active oxygen | Storage stability of adhesive sheet | Peel-adhesion strength g/25 mm-wide | Tack | Holding strength (second) | |
| Ex. 16 | 0.30 | 0.07 | 63.0 | A | 1,540 | 2 | >24 hours | 30.4 |
| Ex. 17 | 1.50 | 0.56 | 7.9 | A | 1,550 | 3 | >24 hours | 31.2 |
| Ex. 18 | 1.10 | 0.36 | 12.2 | A | 1,760 | 3 | >24 hours | 33.2 |
| Ex. 19 | 1.05 | 0.35 | 12.6 | A | 1,720 | 3 | >24 hours | 33.1 |
| Ex. 20 | 1.23 | 0.41 | 10.8 | A | 1,400 | 3 | >24 hours | 31.1 |
| Ex. 21 | 1.17 | 0.39 | 11.3 | A | 1,500 | 3 | >24 hours | 29.1 |

Ex. = Example, CEx. = Comparative Example

Before setting, the anaerobic adhesive of the present invention shows a peel-adhesion strength of 1,500 g/25 mm or higher, a tack of 3 or more and a holding strength of 1,000 seconds or longer (even without polyisocyanate), as shown in Tables. Further, it shows a shear adhesion strength of 15 kg/cm$^2$ or more after allowed to stand for 1 week. Therefore, the anaerobic adhesive of the present invention is excellent in both adhesion properties before setting and adhesion strength after setting. Accordingly, the present invention can provide an anaerobic adhesive which has excellent adhesion properties when articles are attached to each other through it, which, after the articles are attached, gradually undergoes setting to exhibits high adhesion strength, and which therefore has an excellent balance between the adhesion properties before setting and the adhesion strength after setting. Further, tile anaerobic adhesive sheet obtained by coating or impregnating a substrate with the above anaerobic adhesive is excellent in both the storage stability and the setting properties. Further, after articles are attached through it, the adhesion strength of the anaerobic adhesive sheet reaches the adhesion strength of an adhesive, and the setting does not require any special device or apparatus such as a hot oven. The anaerobic adhesive sheet of the present invention can therefore be used in various fields.

What is claimed is:

1. An anaerobic adhesive comprising;

(A) a rubber-based resin having adhesion properties, (B) a compound which has both the capability of absorbing oxygen and the capability of forming peroxide, and which shows an oxygen absorption amount of 0.1 to 3.0% (weight of absorbed oxygen/weight) and an active oxygen amount of 0.01 to 1.0% (weight of active oxygen/weight), said compound being at least one compound selected from the group consisting of a rosin polyhydric alcohol ester, a polymerized rosin, a polymerized rosin polyhydric alcohol ester, a rosin phenolic resin, a terpene resin, a terpene phenolic resin, an aromatic compound modified terpene resin, a hydrogenated terpene resin, an aliphatic petroleum resin and a copolymer petroleum resin, (C) an ethylenically unsaturated monomer or oligomer, (D) an organic peroxide, and (E) a polyepoxy compound in an amount of 0.05 to 2.0 parts by weight per 100 parts by weight of the adhesive, wherein:

the amount of the compound (B) is 30 to 150 parts by weight per 100 parts by weight of the adhesive rubber-based resin (A), the amount of the organic peroxide (D) is 0.1 to 15 parts by weight per 100 parts by weight of the adhesive rubber-based resin (A), and the ethylenically unsaturated monomer or oligomer (C) is contained in such an amount that the amount of ethylenically unsaturated groups of the ethylenically unsaturated monomer or oligomer (C) per mole of the active oxygen contained in the compound (B) is 2 to 140 mol.

2. An adhesive according to claim 1, wherein the compound (B) is at least one member selected from the group consisting of a polymerized rosin, a polymerized rosin polyhydric alcohol ester, a terpene phenolic resin and an aliphatic petroleum resin.

3. An adhesive according to claim 1 or wherein a polymerization inhibitor (F) is further contained in an amount of 0.01 to 1.0 parts by weight per 100 parts by weight of the adhesive.

* * * * *

UNITED STATES PATENT AND TRADEMARK OFFICE
CERTIFICATE OF CORRECTION

PATENT NO. : 5,596,028
DATED : January 21, 1997
INVENTOR(S) : MASATO YANAGI, SATORU KAGAO, MAKOTO DOHI and SANAE NAKAIZUMI

It is certified that error appears in the above-identified patent and that said Letters Patent is hereby corrected as shown below:

Column 12, line 29, correct the spelling of "Hexahydrophthalic".

Column 18, line 18, change "Nagoya" to --Nagase--.

Column 20, line 61, the word "or" should be replaced by a comma (,).

Signed and Sealed this

Twenty-first Day of April, 1998

Attest:

BRUCE LEHMAN

Attesting Officer   Commissioner of Patents and Trademarks